United States Patent
Jo et al.

(10) Patent No.: US 9,476,502 B2
(45) Date of Patent: Oct. 25, 2016

(54) HYDRAULIC PRESSURE SUPPLY SYSTEM OF AUTOMATIC TRANSMISSION

(71) Applicant: Hyundai Motor Company, Seoul (KR)

(72) Inventors: Se Hwan Jo, Bucheon-si (KR); Jin Young Hwang, Busan (KR); Taehwan Wi, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 422 days.

(21) Appl. No.: 14/088,979

(22) Filed: Nov. 25, 2013

(65) Prior Publication Data

US 2014/0290767 A1 Oct. 2, 2014

(30) Foreign Application Priority Data

Apr. 2, 2013 (KR) .................. 10-2013-0036028

(51) Int. Cl.
*F16H 61/02* (2006.01)
*F16H 61/00* (2006.01)

(52) U.S. Cl.
CPC ...... *F16H 61/0206* (2013.01); *F16H 61/0021* (2013.01); *Y10T 137/85986* (2015.04)

(58) Field of Classification Search
CPC .................. F16H 61/0206; F16H 61/0021
See application file for complete search history.

(56) References Cited

U.S. PATENT DOCUMENTS

| | | | |
|---|---|---|---|
| 2012/0141302 A1* | 6/2012 | Hwang | F16H 61/0025 417/253 |
| 2014/0060676 A1* | 3/2014 | Wi | F16H 61/0021 137/565.01 |
| 2014/0060677 A1* | 3/2014 | Wi | F16H 61/0031 137/565.01 |
| 2014/0064990 A1* | 3/2014 | Jo | F04B 49/002 417/253 |
| 2014/0294618 A1* | 10/2014 | Jo | F04B 23/04 417/286 |
| 2015/0027570 A1* | 1/2015 | Wi | F16H 61/0021 137/563 |
| 2015/0167835 A1* | 6/2015 | Hwang | F16H 61/0031 137/565.14 |
| 2015/0167837 A1* | 6/2015 | Lee | F16H 61/0025 74/473.11 |

FOREIGN PATENT DOCUMENTS

| | | |
|---|---|---|
| JP | 4333390 B2 | 7/2009 |
| JP | 5012321 B2 | 6/2012 |
| KR | 10-1338455 B1 | 12/2013 |

* cited by examiner

*Primary Examiner* — Derek D Knight
(74) *Attorney, Agent, or Firm* — Morgan, Lewis & Bockius LLP

(57) ABSTRACT

A hydraulic pressure supply system of an automatic transmission for a vehicle is disclosed. The hydraulic pressure supply system of an automatic transmission for a vehicle may supply a low hydraulic pressure generated at a low-pressure hydraulic pump to a low pressure portion through a low-pressure regulator valve, may supply a portion of the low hydraulic pressure to a high-pressure hydraulic pump, and may supply a high hydraulic pressure generated at the high-pressure hydraulic pump to a high pressure portion through a high-pressure regulator valve.

20 Claims, 2 Drawing Sheets

HYDRAULIC PRESSURE SUPPLY SYSTEM OF AUTOMATIC TRANSMISSION

CROSS-REFERENCE TO RELATED APPLICATION

The present application claims priority of Korean Patent Application Number 10-2013-0036028 filed on Apr. 2, 2013, the entire contents of which application are incorporated herein for all purposes by this reference.

BACKGROUND OF INVENTION

1. Field of Invention

The present invention relates to a hydraulic pressure supply system of an automatic transmission for a vehicle. More particularly, the present invention relates to a hydraulic pressure supply system of an automatic transmission for a vehicle which supplies all the oil generated at a low-pressure hydraulic pump and a high-pressure hydraulic pump to a high pressure portion when the high pressure portion requires a large amount of oil temporarily, for example at initial starting or occurrence of shifting event.

2. Description of Related Art

Recently, vehicle makers direct all their strength to improve fuel economy due to worldwide high oil prices and strengthen of exhaust gas regulations. Improvement of fuel economy may be achieved by improving power delivery efficiency, and the improvement of the power delivery efficiency may be achieved by minimizing unnecessary power consumption of a hydraulic pump.

A recent automatic transmission is provided with a low-pressure hydraulic pump and a high-pressure hydraulic pump so as to improve fuel economy. Therefore, hydraulic pressure generated by the low-pressure hydraulic pump is supplied to a low pressure portion (i.e., a torque converter, a cooling device, and a lubrication device), and hydraulic pressure generated by the high-pressure hydraulic pump is supplied to a high pressure portion (i.e., friction members selectively operated when shifting).

In further detail, general hydraulic pressure of the automatic transmission is generated for the low pressure portion (i.e., generated by the low-pressure hydraulic pump), and hydraulic pressure demanded by the high pressure portion is generated by the high-pressure hydraulic pump and then is supplied to the high pressure portion. Therefore, fuel economy may be improved by minimizing power consumption for driving the hydraulic pump, and noise and vibration may be reduced and durability may be improved by reducing load applied to the hydraulic pump.

After the hydraulic pressure generated at the low-pressure hydraulic pump is supplied to the high-pressure hydraulic pump, however, the high hydraulic pressure is generated at high-pressure hydraulic pump in a conventional hydraulic pressure supply system. Therefore, the oil supplied to the high pressure portion may be insufficient temporarily due to delay in RPM rise of the hydraulic pump at initial starting or occurrence of shifting event. Thereby, responsiveness may be deteriorated or friction members (i.e., clutch or brake) of the high pressure portion may be damaged.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a hydraulic pressure supply system of an automatic transmission for a vehicle having advantages of improving responsiveness of a high pressure portion and preventing friction members from being damaged by firstly supplying oil to the high pressure portion at initial starting or occurrence of shifting event.

A hydraulic pressure supply system of an automatic transmission for a vehicle according to various aspects of the present invention may generate a low hydraulic pressure and a high hydraulic pressure using an oil stored in an oil pan and may supply the low hydraulic pressure and the high hydraulic pressure respectively to a low pressure portion and a high pressure portion.

The hydraulic pressure supply system may include: a low-pressure hydraulic pump receiving the oil stored in the oil pan through an input line, generating the low hydraulic pressure, and discharging the low hydraulic pressure to a first low-pressure line; a first switch valve selectively connecting the first low-pressure line to a second low-pressure line or blocking the first low-pressure line from the second low-pressure line; a low-pressure regulator valve regulating hydraulic pressure supplied from the first switch valve through the second low-pressure line to a stable low hydraulic pressure, and supplying the regulated low hydraulic pressure to the low pressure portion through a third low-pressure line; a high-pressure hydraulic pump increasing the hydraulic pressure supplied from the low-pressure hydraulic pump through the first low-pressure line to generate the high hydraulic pressure, and discharging the high hydraulic pressure to a high-pressure line; a second switch valve selectively connecting the first low-pressure line to the high-pressure line or blocking the first low-pressure line from the high-pressure line; and a high-pressure regulator valve disposed on the high-pressure line, regulating the hydraulic pressure supplied from the high-pressure hydraulic pump and the hydraulic pressure supplied from the second switch valve to a stable high hydraulic pressure, and supplying the regulated high hydraulic pressure to the high pressure portion.

The low-pressure hydraulic pump and the high-pressure hydraulic pump may be driven by one drive motor. The first switch valve may be controlled by elastic force of an elastic member and a recirculation hydraulic pressure of the high pressure portion counteracting against the elastic force of the elastic member.

The hydraulic pressure supply system may further include a bypass line bypassing the first switch valve and connecting the first low-pressure line to the second low-pressure line. The bypass line may be provided with a first orifice.

The low-pressure regulator valve may regulate the hydraulic pressure of the second low-pressure line to be stable by recirculating through a first recirculation line a portion of the hydraulic pressure supplied from the second low-pressure line, and may supply the regulated hydraulic pressure to the third low-pressure line. The first recirculation line may be connected to the input line. The first recirculation line may be connected to the oil pan.

The low-pressure regulator valve may be controlled by a control pressure of the first solenoid valve, elastic force of an elastic member, and the hydraulic pressure of the third low-pressure line counteracting against the control pressure of a first solenoid valve and the elastic force of the elastic member.

The second switch valve may be controlled by the hydraulic pressure of the high-pressure line, elastic force of an elastic member, and the hydraulic pressure of the first low-pressure line counteracting against the hydraulic pressure of the high-pressure line and the elastic force of the elastic member.

The high-pressure regulator valve may regulate the hydraulic pressure of the high-pressure line to be stable by discharging a portion of the hydraulic pressure of the high-pressure line to the second low-pressure line through a second recirculation line and supplying the portion of the hydraulic pressure of the high-pressure line to the first switch valve as a control pressure.

The second recirculation line may be provided with a second orifice close to the second low-pressure line, a pressure sensor may be mounted between the second orifice and the high-pressure regulator valve, and a branch line of the second recirculation line may be bifurcated between the second orifice and the pressure sensor and be connected to the first switch valve.

The high-pressure regulator valve may be controlled by a control pressure of a second solenoid valve, elastic force of an elastic member, and the hydraulic pressure of the high-pressure line counteracting against the control pressure of the second solenoid valve and the elastic force of the elastic member.

A hydraulic pressure supply system of an automatic transmission for a vehicle according to various other aspects of the present invention may supply a low hydraulic pressure generated at a low-pressure hydraulic pump to a low pressure portion through a low-pressure regulator valve, may supply a portion of the low hydraulic pressure to a high-pressure hydraulic pump, and may supply a high hydraulic pressure generated at the high-pressure hydraulic pump to a high pressure portion through a high-pressure regulator valve.

The hydraulic pressure supply system may include: a first switch valve mounted on a low-pressure line connecting the low-pressure hydraulic pump with the low-pressure regulator valve and selectively opening or closing the low-pressure line; and a second switch valve mounted between the low-pressure line and a high-pressure line connecting the high-pressure hydraulic pump with the high-pressure regulator valve and selectively connecting the low-pressure line to or blocking the low-pressure line from the high-pressure line.

The low-pressure hydraulic pump and the high-pressure hydraulic pump may be driven by one drive motor.

The hydraulic pressure supply system may further include a bypass line bifurcating from the low-pressure line at a downstream of the first switch valve and joining to the low-pressure line at an upstream of the first switch valve. The bypass line may be provided with a first orifice.

The low-pressure regulator valve may recirculate a portion of the hydraulic pressure supplied from the low-pressure hydraulic pump through a first recirculation line and may supply a stable low hydraulic pressure to the low pressure portion.

The high-pressure regulator valve may regulate the hydraulic pressure of the high-pressure line to be stable by discharging a portion of the hydraulic pressure of the high-pressure line to the low-pressure line through a second recirculation line and supplying the portion of the hydraulic pressure of the high-pressure line to the first switch valve as a control pressure.

The second recirculation line may be provided with a second orifice close to the low-pressure line, a pressure sensor may be mounted between the second orifice and the high-pressure regulator valve, and a branch line of the second recirculation line may be bifurcated between the second orifice and the pressure sensor and be connected to the first switch valve.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
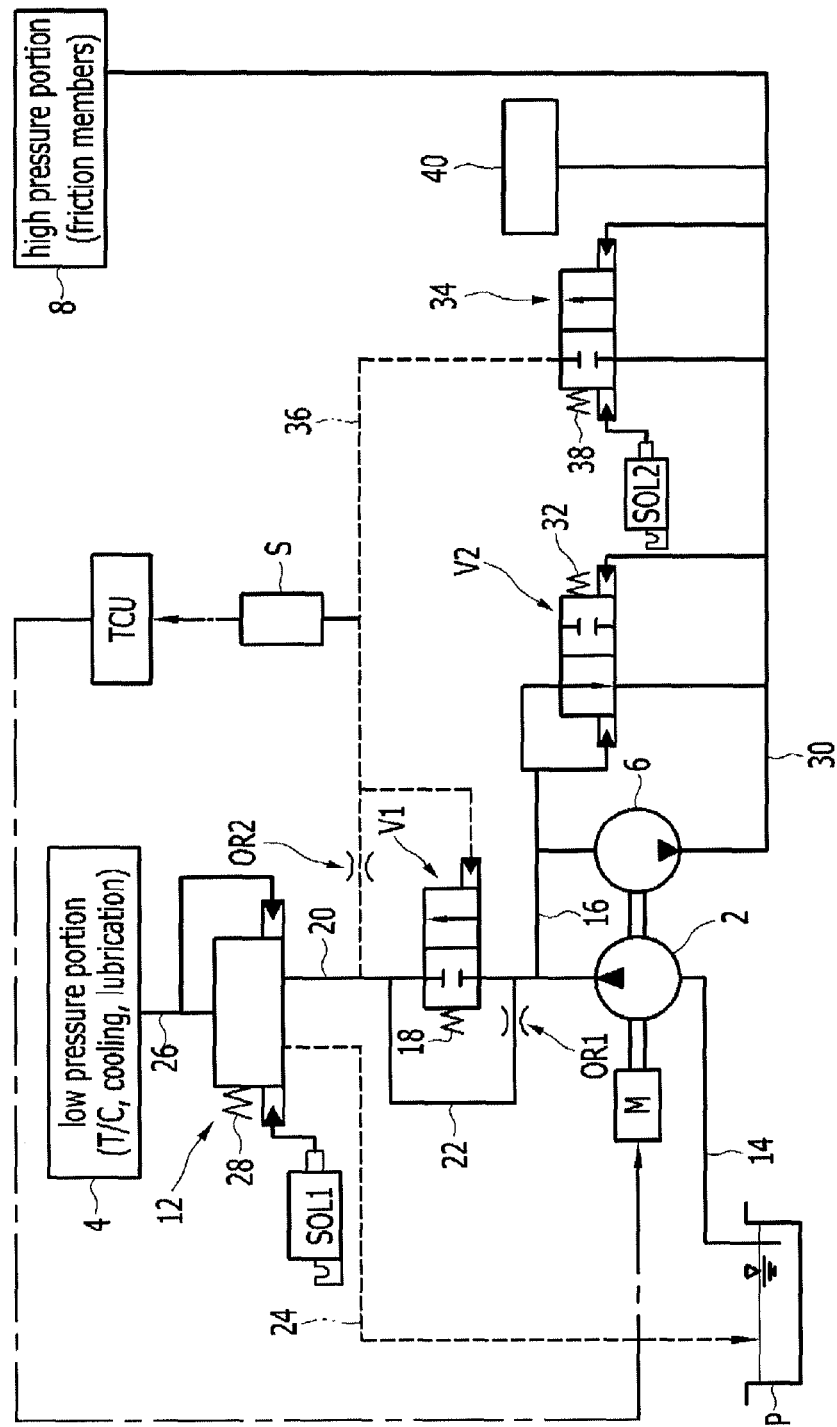
FIG. 1 is a schematic diagram of a hydraulic pressure supply system according to the present invention with oil being supplied firstly to a high pressure portion.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the illustrated exemplary embodiments will be omitted, and the same constituent elements are denoted by the same reference numerals in this specification. In the detailed description, ordinal numbers are used for distinguishing constituent elements having the same terms, and have no specific meanings.

FIG. 1 is a schematic diagram of a hydraulic pressure supply system according to various embodiments of the present invention with oil being supplied firstly to a high pressure portion. Referring to FIG. 1, a hydraulic pressure supply system is adapted or configured to supply a low hydraulic pressure generated by a low-pressure hydraulic pump 2 to a low pressure portion 4 such as a torque converter (T/C), a cooling portion, and a lubrication portion and to supply a high hydraulic pressure generated by a high-pressure hydraulic pump 6 to a high pressure portion 8 for operating friction members related to shifting.

The low hydraulic pressure is a lower pressure facilitating operation of the torque converter (T/C) and cooling and lubrication, and the high hydraulic pressure is a high pressure facilitating operation of a plurality of friction members.

The low hydraulic pressure is generated at the low-pressure hydraulic pump 2 and is supplied to the low pressure portion 4 through a first switch valve V1 and a low-pressure regulator valve 12. The low-pressure hydraulic pump 2 is connected to an oil pan P through an input line 14, and the low hydraulic pressure generated by the low-pressure hydraulic pump 2 is discharged to a first low-pressure line 16.

The first switch valve V1 may be a spool valve, and is controlled by a recirculation hydraulic pressure of the high pressure portion 8 and elastic force of an elastic member 18 counteracting against the recirculation hydraulic pressure so as to supply the hydraulic pressure of the first low-pressure line 16 to the low-pressure regulator valve 12 or prevent the hydraulic pressure of the first low-pressure line 16 from being supplied to the low-pressure regulator valve 12.

That is, if the recirculation hydraulic pressure supplied from the high pressure portion 8 can overcome the elastic force of the elastic member 18, the first switch valve V1 supplies the hydraulic pressure of the first low-pressure line 16 to the low-pressure regulator valve 12 through a second low-pressure line 20. On the contrary, if the recirculation hydraulic pressure supplied from the high pressure portion 8 does not overcome the elastic force of the elastic member 18, the first switch valve V1 blocks the first low-pressure line 16 from the second low-pressure line 20.

In addition, the first low-pressure line 16 positioned upstream of the first switch valve V1 is connected to the second low-pressure line 20 positioned downstream of the first switch valve V1 by a bypass line 22, and the bypass line 22 is provided with a first orifice OR1. Therefore, if the first switch valve V1 blocks the first low-pressure line 16 from the second low-pressure line 20, a minimum hydraulic pressure is supplied from the first low-pressure line 16 to the second low-pressure line 20.

The low-pressure regulator valve 12 is connected to the switch valve V1 through the second low-pressure line 20, and is connected to the oil pan P through a first recirculation line 24. Therefore, the low-pressure regulator valve 12 recirculates a portion of the hydraulic pressure supplied from the first switch valve V1 to the oil pan P through the first recirculation line 24 and regulates the hydraulic pressure. The hydraulic pressure regulated by the low-pressure regulator valve 12 is supplied to the low pressure portion 4 through a third low-pressure line 26.

For this purpose, the low-pressure regulator valve 12 may be a spool valve, and is controlled by a control pressure of a first solenoid valve SOLI, elastic force of an elastic member 28, and the hydraulic pressure of the third low-pressure line 26. The elastic force of the elastic member 28 is set according to a target pressure of the third low-pressure line 26. In addition, the first solenoid valve SOLI may be a proportional control solenoid valve.

In addition, a second switch valve V2 connected to the first low-pressure line 16 selectively supplies the hydraulic pressure of the first low-pressure line 16 to a high-pressure line 30. For this purpose, the second switch valve V2 may be a spool valve, and is controlled by the hydraulic pressure of the first low-pressure line 16, a hydraulic pressure of the high-pressure line 30 and elastic force of an elastic member 32.

That is, if the hydraulic pressure of the first low-pressure line 16 is higher than the hydraulic pressure of the high-pressure line 30, the second switch valve V2 supplies the hydraulic pressure of the first low-pressure line 16 to the high-pressure line 30. On the contrary, if the hydraulic pressure of the high-pressure line 30 is higher than the hydraulic pressure of the first low-pressure line 16, the second switch valve V2 prevents the oil from flowing back from high-pressure line 30 to the first low-pressure line 16.

The high-pressure hydraulic pump 6 increases the low hydraulic pressure supplied through the first low-pressure line 16 and discharges the increased hydraulic pressure to the high-pressure line 30.

In addition, the hydraulic pressure discharged from the high-pressure hydraulic pump 6 to the high-pressure line 30 is regulated to be a stable high hydraulic pressure at a high-pressure regulator valve 34, and is then supplied to the high pressure portion 8.

The high-pressure regulator valve 34 is disposed on the high-pressure line 30, and is connected to the second low-pressure line 20 and the first switch valve V1 through a second recirculation line 36. Therefore, the high-pressure regulator valve 34 recirculates a portion of the hydraulic pressure supplied through the high-pressure line 30 to the second low-pressure line 20 and supplies the portion of the hydraulic pressure to the first switch valve V1 as a control pressure through the second recirculation line 36.

For this purpose, the high-pressure regulator valve 34 may be a spool valve. In addition, the high-pressure regulator valve 34 is controlled by a control pressure of a second solenoid valve SOL2, elastic force of an elastic member 38, and the hydraulic pressure of the high-pressure line 30. The elastic force of the elastic member 38 may be set according to a target pressure of the high-pressure line 30. In addition, the second solenoid valve SOL2 may be a proportional control solenoid valve.

The second recirculation line 36 connects the high-pressure regulator valve 34 to the second low-pressure line 20, a second orifice OR2 is disposed on the second recirculation line 36, and a pressure sensor S is disposed between the second orifice OR2 and the high-pressure regulator valve 34.

In addition, a branch line of the second recirculation line 36 is bifurcated between the second orifice OR2 and the pressure sensor S, and is connected to the first switch valve V1.

Because oil amount recirculated to the second low-pressure line 20 through the second recirculation line 36 is controlled to be constant by the second orifice OR2, the oil amount in the second low-pressure line 20 does not changed greatly and becomes stable.

In addition, the oil amount in the second recirculation line 36 is maintained to be constant, and the pressure sensor S detects the hydraulic pressure of the stable oil amount in the second recirculation line 36 and transmits information corresponding thereto to a transmission control unit TCU.

In this case, the transmission control unit TCU controls a rotation speed of a drive motor M driving the low-pressure hydraulic pump 2 and the high-pressure hydraulic pump 6 according to the pressure information detected by the pressure sensor S.

The first and second solenoid valves SOL1 and SOL2 may receive a control pressure from a reducing valve 40 connected to the high-pressure line 30.

In the hydraulic pressure supply system according to the present invention, as shown in FIG. 1, the first switch valve V1 is controlled to become a blocking state by the elastic force of the elastic member 18 so as to block the first low-pressure line 16 from the second low-pressure line 20 at initial starting or occurrence of shifting event. In this case, the hydraulic pressure generated by the low-pressure hydraulic pump 2 and supplied to the first low-pressure line 16 is supplied to the high-pressure hydraulic pump 6 and the second switch valve V2.

The high hydraulic pressure generated by the high-pressure hydraulic pump 6 is supplied to the high-pressure line 30, and the hydraulic pressure of the low-pressure line 16 supplied to the second switch valve V2 is operated as the control pressure of the second switch valve V2. Therefore, the first low-pressure line 16 and the high-pressure line 30 are connected and the hydraulic pressure of the first low-pressure line 16 is supplied to the high-pressure line 30.

Because both of the hydraulic pressures generated by the low-pressure hydraulic pump 2 and the high-pressure hydraulic pump 6 are supplied to the high pressure portion 8, responsiveness of the high pressure portion 8 may be improved and friction members of the high pressure portion 8 may be prevented from being damaged.

Figure 2:
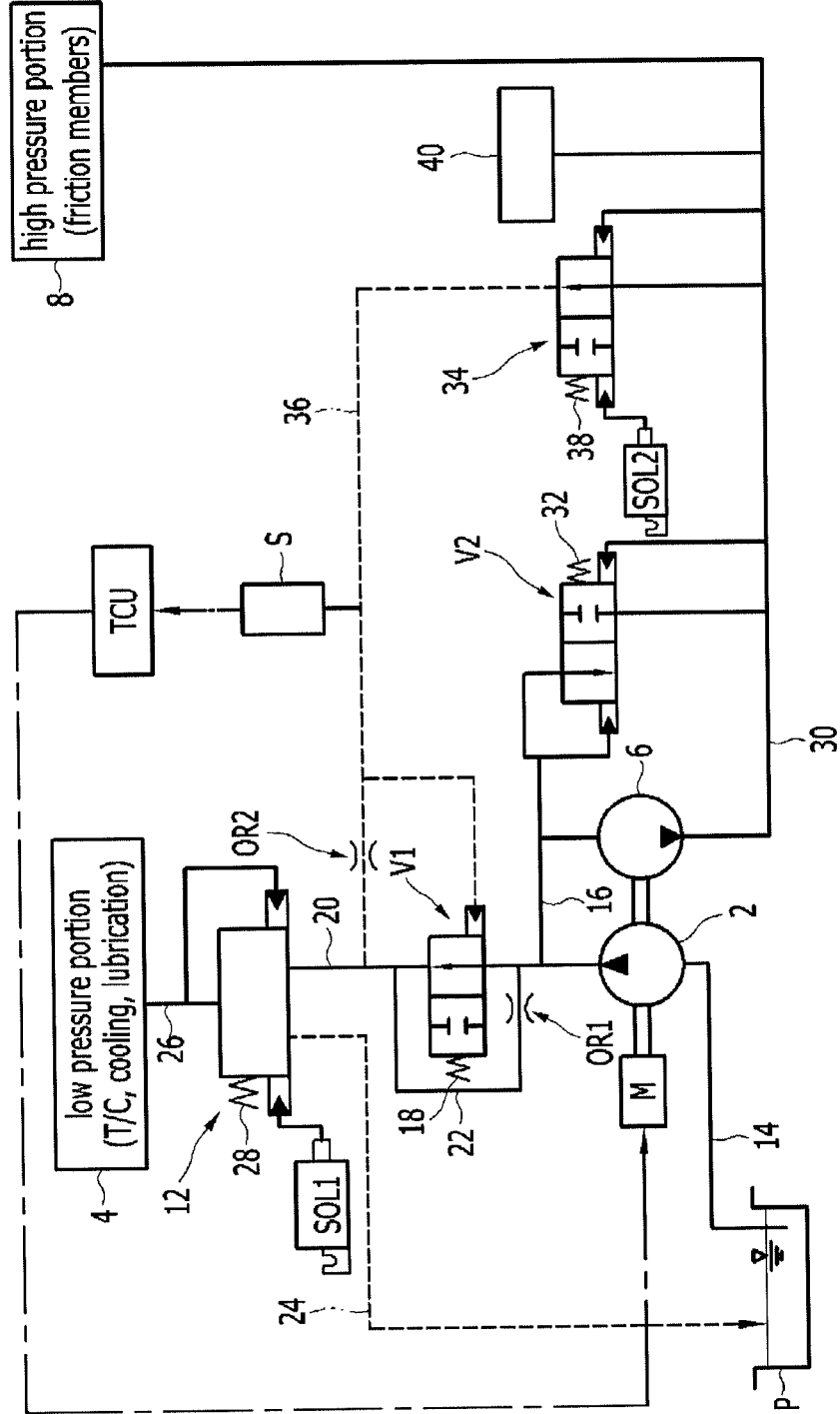
FIG. 2 is a schematic diagram of a hydraulic pressure supply system according to the present invention with oil being supplied normally.

FIG. 2 is a schematic diagram of a hydraulic pressure supply system according to various embodiments of the present invention with oil being supplied normally. referring to FIG. 2, if both of the hydraulic pressures generated by the low-pressure hydraulic pump 2 and the high-pressure hydraulic pump 6 are supplied to the high pressure portion 8 and the hydraulic pressure of the high pressure portion 8 reaches to the target pressure as shown in FIG. 1, the hydraulic pressure of the high-pressure line 30 is discharged to the second recirculation line 36 by operation of the high-pressure regulator valve 34.

In this case, the hydraulic pressure of the second recirculation line 36 is supplied to the first switch valve V1 as the control pressure and is controlled to be stable by the second orifice OR2. After that, the hydraulic pressure of the second recirculation line 36 is supplied to the second low-pressure line 20.

Therefore, the first switch valve V1 connects the first low-pressure line 16 with the second low-pressure line 20 by the hydraulic pressure of the second recirculation line 36, and the hydraulic pressure of the first low-pressure line 16 is supplied to the low-pressure regulator valve 12 through the second low-pressure line 20. In addition, the hydraulic pressure supplied to the low-pressure regulator valve 12 is supplied to the low pressure portion 4 through the third low-pressure line 26.

Therefore, the hydraulic pressure generated by the low-pressure hydraulic pump 2 is supplied to the low pressure portion 4 and the hydraulic pressure generated by the high-pressure hydraulic pump 6 is supplied to the high pressure portion 8. Therefore, the hydraulic pressure supply system operates normally.

Because the low-pressure hydraulic pump 2 generates the low hydraulic pressure, and the high-pressure hydraulic pump 6 increases the portion of the hydraulic pressure supplied from the low-pressure hydraulic pump 2 and generates the high hydraulic pressure, power consumption of the hydraulic pump may be minimized, durability may be improved, and noise and vibration of the hydraulic pump may be reduced according to the various embodiments of the present invention.

In addition, because both of the hydraulic pressures generated by the low-pressure hydraulic pump 2 and the high-pressure hydraulic pump 6 are supplied to the high pressure portion 8 firstly by control of the first switch valve V1 and the second switch valve V2 at initial starting or occurrence of shifting event, shifting responsiveness may be improved and friction members of the high pressure portion may be prevented from being damaged.

For convenience in explanation and accurate definition in the appended claims, the terms "upstream" or "downstream", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure supply system of an automatic transmission for a vehicle, wherein the hydraulic pressure supply system generates a low hydraulic pressure and a high hydraulic pressure using an oil stored in an oil pan and supplies the low hydraulic pressure and the high hydraulic pressure respectively to a low pressure portion and a high pressure portion, the hydraulic pressure supply system comprising:
   a low-pressure hydraulic pump receiving the oil stored in the oil pan through an input line, generating the low hydraulic pressure, and discharging the low hydraulic pressure to a first low-pressure line;
   a first switch valve selectively connecting the first low-pressure line to a second low-pressure line or blocking the first low-pressure line from the second low-pressure line;
   a low-pressure regulator valve regulating hydraulic pressure supplied from the first switch valve through the second low-pressure line to a stable low hydraulic pressure, and supplying the regulated low hydraulic pressure to the low pressure portion through a third low-pressure line;
   a high-pressure hydraulic pump increasing the hydraulic pressure supplied from the low-pressure hydraulic pump through the first low-pressure line to generate the high hydraulic pressure, and discharging the high hydraulic pressure to a high-pressure line;
   a second switch valve selectively connecting the first low-pressure line to the high-pressure line or blocking the first low-pressure line from the high-pressure line; and
   a high-pressure regulator valve disposed on the high-pressure line, regulating the hydraulic pressure supplied from the high-pressure hydraulic pump and the hydraulic pressure supplied from the second switch valve to a stable high hydraulic pressure, and supplying the regulated high hydraulic pressure to the high pressure portion.

2. The hydraulic pressure supply system of claim 1, wherein the low-pressure hydraulic pump and the high-pressure hydraulic pump are driven by one drive motor.

3. The hydraulic pressure supply system of claim 1, wherein the first switch valve is controlled by elastic force of an elastic member and a recirculation hydraulic pressure of the high pressure portion counteracting against the elastic force of the elastic member.

4. The hydraulic pressure supply system of claim 1, further comprising a bypass line bypassing the first switch valve and connecting the first low-pressure line to the second low-pressure line.

5. The hydraulic pressure supply system of claim 4, wherein the bypass line is provided with a first orifice.

6. The hydraulic pressure supply system of claim 1, wherein the low-pressure regulator valve regulates the hydraulic pressure of the second low-pressure line to be stable by recirculating through a first recirculation line a portion of the hydraulic pressure supplied from the second low-pressure line, and supplies the regulated hydraulic pressure to the third low-pressure line.

7. The hydraulic pressure supply system of claim 6, wherein the first recirculation line is connected to the input line.

8. The hydraulic pressure supply system of claim 6, wherein the first recirculation line is connected to the oil pan.

9. The hydraulic pressure supply system of claim 1, wherein the low-pressure regulator valve is controlled by a control pressure of a first solenoid valve, elastic force of an elastic member, and the hydraulic pressure of the third low-pressure line counteracting against the control pressure of the first solenoid valve and the elastic force of the elastic member.

10. The hydraulic pressure supply system of claim 1, wherein the second switch valve is controlled by the hydraulic pressure of the high-pressure line, elastic force of an elastic member, and the hydraulic pressure of the first low-pressure line counteracting against the hydraulic pressure of the high-pressure line and the elastic force of the elastic member.

11. The hydraulic pressure supply system of claim 1, wherein the high-pressure regulator valve regulates the hydraulic pressure of the high-pressure line to be stable by discharging a portion of the hydraulic pressure of the high-pressure line to the second low-pressure line through a second recirculation line and supplying the portion of the hydraulic pressure of the high-pressure line to the first switch valve as a control pressure.

12. The hydraulic pressure supply system of claim 11, wherein the second recirculation line is provided with a second orifice close to the second low-pressure line, a pressure sensor is mounted between the second orifice and the high-pressure regulator valve, and a branch line of the second recirculation line is bifurcated between the second orifice and the pressure sensor and is connected to the first switch valve.

13. The hydraulic pressure supply system of claim 1, wherein the high-pressure regulator valve is controlled by a control pressure of a second solenoid valve, elastic force of an elastic member, and the hydraulic pressure of the high-pressure line counteracting against the control pressure of the second solenoid valve and the elastic force of the elastic member.

14. A hydraulic pressure supply system of an automatic transmission for a vehicle, wherein the hydraulic pressure supply system supplies a low hydraulic pressure generated at a low-pressure hydraulic pump to a low pressure portion through a low-pressure regulator valve, supplies a portion of the low hydraulic pressure to a high-pressure hydraulic pump, and supplies a high hydraulic pressure generated at the high-pressure hydraulic pump to a high pressure portion through a high-pressure regulator valve, the hydraulic pressure supply system comprising:
 a first switch valve mounted on a low-pressure line connecting the low-pressure hydraulic pump with the low-pressure regulator valve and selectively opening or closing the low-pressure line; and
 a second switch valve mounted between the low-pressure line and a high-pressure line connecting the high-pressure hydraulic pump with the high-pressure regulator valve and selectively connecting the low-pressure line to or blocking the low-pressure line from the high-pressure line.

15. The hydraulic pressure supply system of claim 14, wherein the low-pressure hydraulic pump and the high-pressure hydraulic pump are driven by one drive motor.

16. The hydraulic pressure supply system of claim 14, further comprising a bypass line bifurcating from the low-pressure line at a downstream of the first switch valve and joining to the low-pressure line at an upstream of the first switch valve.

17. The hydraulic pressure supply system of claim 16, wherein the bypass line is provided with a first orifice.

18. The hydraulic pressure supply system of claim 14, wherein the low-pressure regulator valve recirculates a portion of the hydraulic pressure supplied from the low-pressure hydraulic pump through a first recirculation line and supplies a stable low hydraulic pressure to the low pressure portion.

19. The hydraulic pressure supply system of claim 15, wherein the high-pressure regulator valve regulates the hydraulic pressure of the high-pressure line to be stable by discharging a portion of the hydraulic pressure of the high-pressure line to the low-pressure line through a second recirculation line and supplying the portion of the hydraulic pressure of the high-pressure line to the first switch valve as a control pressure.

20. The hydraulic pressure supply system of claim 19, wherein the second recirculation line is provided with a second orifice close to the low-pressure line, a pressure sensor is mounted between the second orifice and the high-pressure regulator valve, and a branch line of the second recirculation line is bifurcated between the second orifice and the pressure sensor and is connected to the first switch valve.

* * * * *